(12) United States Patent
Levin-Michael

(10) Patent No.: US 7,899,996 B1
(45) Date of Patent: Mar. 1, 2011

(54) FULL TRACK READ FOR ADAPTIVE PRE-FETCHING OF DATA

(75) Inventor: Orit Levin-Michael, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 510 days.

(21) Appl. No.: 12/006,127

(22) Filed: Dec. 31, 2007

(51) Int. Cl.
*G06F 12/00* (2006.01)

(52) U.S. Cl. .................. 711/137; 711/170; 712/207

(58) Field of Classification Search .................. 711/137
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,941,981 A * | 8/1999 | Tran | 712/207 |
| 6,003,114 A | 12/1999 | Bachmat | |
| 6,085,287 A * | 7/2000 | O'Neil et al. | 711/113 |
| 6,098,153 A * | 8/2000 | Fuld et al. | 711/134 |
| 6,529,998 B1 * | 3/2003 | Yochai et al. | 711/137 |
| 6,961,824 B2 * | 11/2005 | Rowlands et al. | 711/137 |

\* cited by examiner

*Primary Examiner*—Kevin L Ellis
*Assistant Examiner*—Matthew Bradley
(74) *Attorney, Agent, or Firm*—Muirhead and Saturnelli, LLC (57) ABSTRACT

Adaptively pre-fetching data includes collecting a first set of statistics based on a number of avoidable read-misses in which data exists that is prior to data being read, collecting a second set of statistics based on a number of avoidable read-misses in which data exists that follows data being read, and collecting a third set of statistics based on said first and second sets of statistics. On the basis of the second set of statistics, a pre-fetch technique is selected from a first technique that pre-fetches data following data being read and a second technique that pre-fetches data before and following the data being read. The first and third set of statistics may be used to determine when to pre-fetch data.

25 Claims, 7 Drawing Sheets

FULL TRACK READ FOR ADAPTIVE PRE-FETCHING OF DATA

BACKGROUND OF THE INVENTION

1. Technical Field

This application relates to computer storage devices, and more particularly to the field of pre-fetching certain data from a disk of a storage device to cache memory thereof.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

A user who requires data from a disk initiates a complex and time-consuming sequence of events for retrieving the data. For example, in the course of retrieving data, a disk controller positions a disk arm to align a read head with the cylinder on the disk that contains that data. The disk controller then waits until the desired data begins passing under the read head. Then, when rotation of the disk finally brings the desired data under the read head, the disk controller initiates the read operation. These events introduce considerable latency into the process of satisfying the user's request for data.

A global cache memory, which is a relatively fast memory that is separate from the disks, may be used to address some of the latency issues associated with disks. The global cache memory may contain recently fetched (requested) data. Upon receiving a request for data, the disk storage system first checks to see if the requested data is already in the global cache memory. If so, the disk storage system retrieves the data directly therefrom without having to access the disk. Such an event is referred to as a "read-hit." A read-hit is a desirable outcome because a read from the cache slot avoids latencies associated with reading from a physical disk drive.

In some cases, the disk storage system discovers that the desired data is not in the global cache memory at all but, instead, is on a disk. In this case, the disk storage system instructs a disk controller to retrieve the desired data from an appropriate track on a disk. Such an event is referred to as a "read-miss." A read-miss is an undesirable outcome because such an operation is afflicted with latencies associated with mechanical motion within the disk drive and possible latencies associated with data transmission between the global cache memory and the disk drive.

Data on a disk may be organized in tracks, which represent an amount of contiguous memory that may be read in a single disk drive operation. The global cache memory may be organized into slots, where each slot corresponds to a track. Whether or not to read an entire track, rather than merely the data specifically requested from that track, is a decision that requires the disk storage system to anticipate whether additional data from that track is likely to be needed in the future. U.S. Pat. No. 6,003,114 to Eitan Bachmat, the contents of which are herein incorporated by reference, describes a system where, in response to a read-miss, the requested data is fetched and stored in the global cache memory. If there is a second request for data from the same track while data for the track is still in cache, the remainder of the track is fetched.

A disadvantage of the foregoing technique is that, the second read miss to the same slot becomes unavoidable U.S. Pat. No. 6,529,998 to Yechiel Yochai and Robert Mason, which is incorporated by reference herein, addresses this issue by reading more than just the requested data based on metrics that do not depend directly on whether other data from a particular track has been accessed recently. U.S. Pat. No. 6,529,998 to Yechiel Yochai and Robert Mason discloses reading to the end of a track in instances where it appears statistically advantageous to do so based on a determination of the number of times a read miss would have been avoided had a previous read within the track been a read to the end of the track.

While the technique disclosed in 6,529,998 improves performance in many instances, it does not take into account the possibility of reads in a track being out of order. That is, an application may cause a first read to occur at one portion of a track and cause a second read to occur at a different portion of the track. If the start of the first portion is after the start of the second portion, then even if the first read is to the end of the track, the second read will still cause a read miss. Furthermore, the first read to the end of the track will not be useful. Accordingly, it is desirable to be able to reduce the number of instances where out of order reads within a track result in read misses.

SUMMARY OF THE INVENTION

According to the system described herein, adaptively pre-fetching data includes collecting a first set of statistics based on a number of avoidable read-misses in which data exists that is prior to data being read. Adaptively pre-fetching data also includes collecting a second set of statistics based on a number of avoidable read-misses in which data exists that follows data being read and collecting a third set of statistics based on said first and second sets of statistics. On the basis of said second set of statistics, a pre-fetch technique is selected from a first technique that pre-fetches data following data being read and a second technique that pre-fetches data before and following the data being read. Upon detection of a read-miss and selecting the first technique, data following data being read is pre-fetched based on comparison of a generated random number and the first set of statistics. Upon detection of a read-miss and selecting the second technique, data before and following data being read is pre-fetched based on a comparison of a generated random number and the third set of statistics. Pre-fetching data before and following data being read may include fetching an entire track from a disk. Pre-fetching data following data being read may include fetching data from the data being read to the end of a track on a disk. Selecting a pre-fetch technique may include comparing the second set of statistics with a predefined value. The predefined value may be a user settable parameter. Following selection of the first technique, data following data being read may be pre-fetched if the generated random number is less than a value based on the first set of statistics and, following selection of the second technique, data before and following data being read may be pre-fetched if the generated random number is less than a value based on the third set of statistics. Upon selection of the first technique and the generated random number being greater than the value based on the first set of statistics, the values based on the sets of statistics may be decremented. Upon selection of the second technique and the generated random number being greater than the value based on the third set of statistics, the values based on the sets of statistics may be decremented.

According further to the system described herein, computer software, provided in a computer-readable storage medium, adaptively pre-fetches data. The software includes executable code that collects a first set of statistics based on a number of avoidable read-misses in which data exists that is prior to data being read. The software also includes executable code that collects a second set of statistics based on a number of avoidable read-misses in which data exists that follows data being read and executable code that collects a third set of statistics based on said first and second sets of statistics. The software also includes executable code that uses said second set of statistics to select a pre-fetch technique from a first technique that pre-fetches data following data being read and a second technique that pre-fetches data before and following the data being read. Additional executable code pre-fetches data following data being read based on comparison of a generated random number and the first set of statistics upon detection of a read-miss and selecting the first technique. Additional executable code pre-fetches data before and following data being read based on a comparison of a generated random number and the third set of statistics upon detection of a read-miss and selecting the second technique. Pre-fetching data before and following data being read may include fetching an entire track from a disk. Pre-fetching data following data being read may include fetching data from the data being read to the end of a track on a disk. Selecting a pre-fetch technique may include comparing the second set of statistics with a predefined value. The predefined value may be a user settable parameter. Following selection of the first technique, data following data being read may be pre-fetched if the generated random number is less than a value based on the first set of statistics and, following selection of the second technique, data before and following data being read may be pre-fetched if the generated random number is less than a value based on the third set of statistics. Upon selection of the first technique and the generated random number being greater than the value based on the first set of statistics, the values based on the sets of statistics may be decremented. Upon selection of the second technique and the generated random number being greater than the value based on the third set of statistics, the values based on the sets of statistics may be decremented.

According further to the system described herein, a storage device includes a plurality of directors, a plurality of disk drives coupled to at least some of the directors, and a global memory, coupled to the directors. At least one of the directors includes software that pre-fetches data from the disks into global memory. The software includes executable code that collects a first set of statistics based on a number of avoidable read-misses in which data exists that is prior to data being read, executable code that collects a second set of statistics based on a number of avoidable read-misses in which data exists that follows data being read, and executable code that collects a third set of statistics based on said first and second sets of statistics. The software also includes executable code that uses said second set of statistics to select a pre-fetch technique from a first technique that pre-fetches data following data being read and a second technique that pre-fetches data before and following the data being read. Additional executable code reads data following data being read based on comparison of a generated random number and the first set of statistics upon detection of a read-miss and selecting the first technique. Additional executable code reads data before and following data being read based on a comparison of a generated random number and the third set of statistics upon detection of a read-miss and selecting the second technique. Pre-fetching data before and following data being read may include fetching an entire track from a disk. Pre-fetching data following data being read may include fetching data from the data being read to the end of a track on a disk. Selecting a pre-fetch technique may include comparing the second set of statistics with a predefined value. The predefined value may be a user settable parameter.

According further to the system described herein, determining when to pre-fetch a full track of data on a disk includes collecting statistics based on a number of avoidable read-misses in which data exists that is in the same track as data being read. Upon detection of a read-miss, a full track of data is pre-fetched based on comparison of a generated random number and the third set of statistics. The statistics may be based on tracking a number of avoidable read-misses in which data exists that follows data being read and a number of avoidable read-misses in which data exists that is prior to data being read.

According further to the system described herein, computer software, provided in a computer-readable medium, determines when to pre-fetch additional data from a disk. The software includes executable code that provides for selection of one of the following modes: a first mode for pre-fetch to end of track only, a second mode for pre-fetch entire track, a third mode where no pre-fetch is performed, and a fourth mode where pre-fetch to an end of track is performed upon second and subsequent read misses for a track. The software also includes executable code that collects a first set of statistics based on a number of avoidable read-misses in which data exists that is prior to data being read, executable code that collects a second set of statistics based on a number of avoidable read-misses in which data exists that follows data being read in response to selection of the second mode, and executable code that collects a third set of statistics based on said first and second sets of statistics in response to selection of the second mode. The software also includes executable code that pre-fetches data following data being read based on comparison of a generated random number and the first set of statistics upon detection of a read-miss and on selecting of the first mode and includes executable code that pre-fetches data before and following data being read based on a comparison of a generated random number and the third set of statistics upon detection of a read-miss and selecting the second mode. The second mode may also include pre-fetching to the end of track and the software may also include executable code that, in response to selection of the second mode, uses the second set of statistics to select a pre-fetch technique from a first technique that pre-fetches data following data being read and a second technique that pre-fetches data before and following the data being read and includes executable code that pre-fetches data following data being read based on selection of the second mode and the first technique.

DETAILED DESCRIPTION OF VARIOUS EMBODIMENTS

Figure 1:
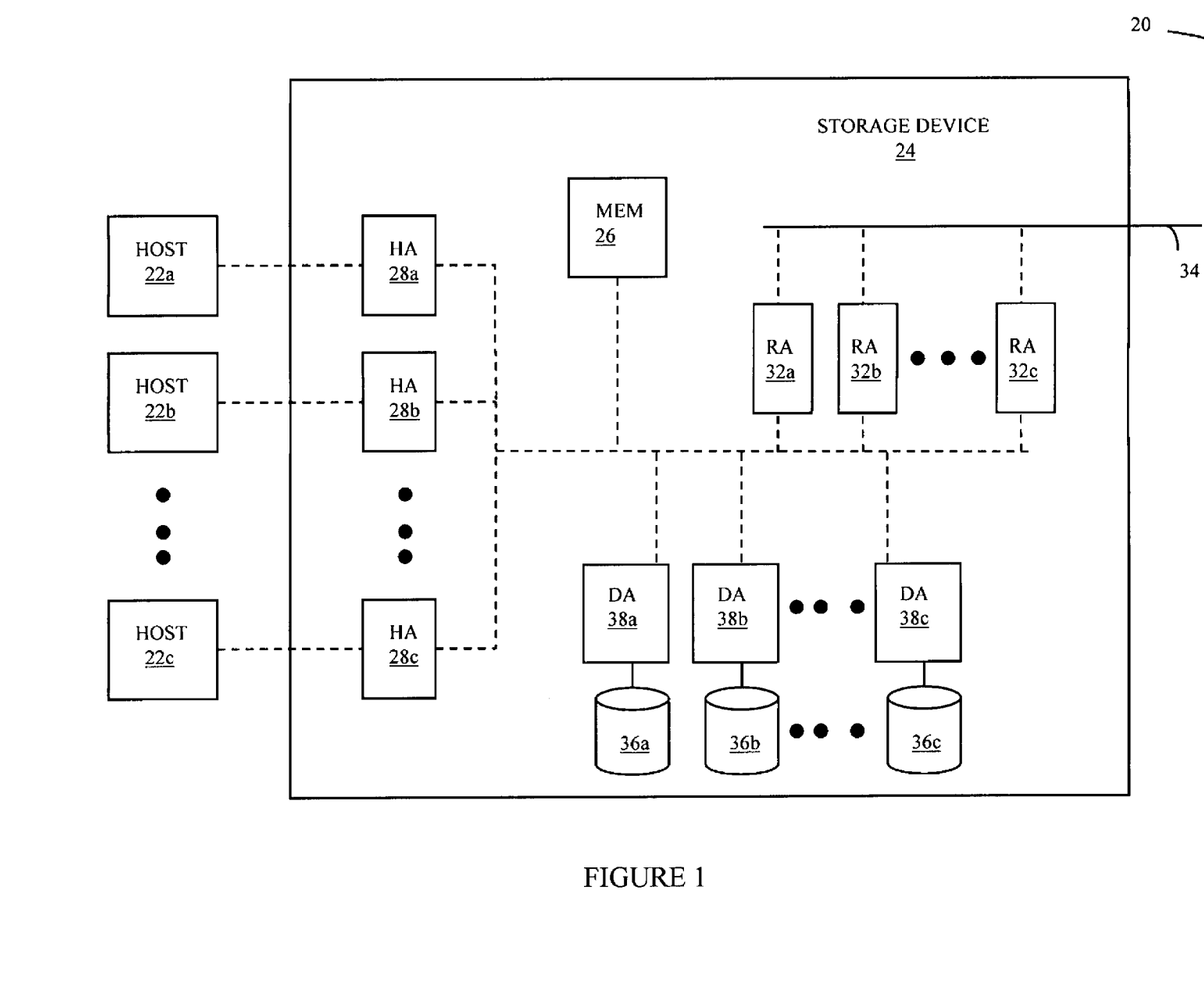
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
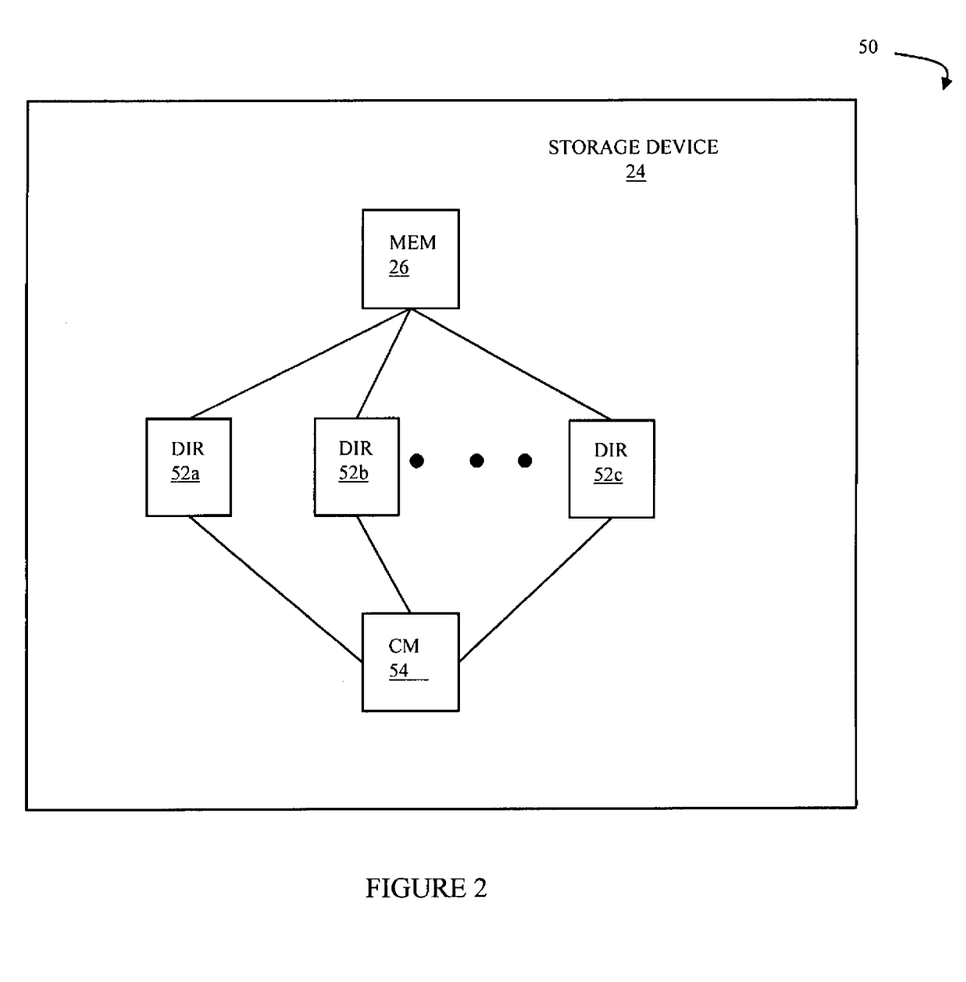
FIG. 2 is a schematic diagram showing a storage device, memory, a plurality of directors, and a communication module according to an embodiment of the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the global memory 26 may be provided on one or more of the directors 52a-52c and shared with other ones of the directors 52a-52c.

Figure 3:
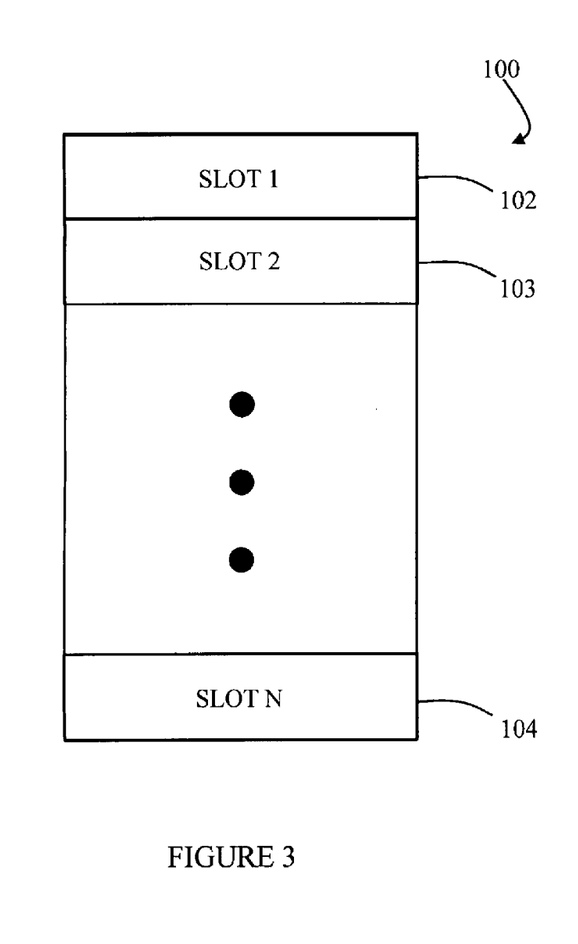
FIG. 3 is a schematic diagram illustrating a global cache memory according to an embodiment of the system described herein.

Referring to FIG. 3, a global cache memory 100 is shown in more detail as including a plurality of slots 102-104. In an embodiment herein, the cache memory 100 may be provided as part of the global memory 26 (provided in a single location and/or distributed among the directors 52a-52c), but it will be appreciated by one of ordinary skill in the art that the global cache memory 100 may be provided using any appropriate mechanism and any appropriate location that is accessible and that is relatively faster (more efficient) than accessing corresponding data on a disk. In an embodiment herein, each of the slots 102-104 of the global cache memory 100 is a fixed size corresponding to a track of data of one of the disks 36a-36c.

The system described herein assumes the existence of a relatively slow memory (e.g., the disks 36a-36c) and a relatively fast memory (e.g., the global memory 26/global cache memory 100). It is desirable to move data from the relatively slow memory to the relatively fast memory in a way that maximizes system performance by attempting to anticipate future data requests and pre-fetching appropriate data from the relatively slow memory into the relatively fast memory. It is desirable to maintain more frequently-accessed data in the global cache memory 100 while having less frequently-accessed data maintained on one of the disks 36a-36c, but not in the global cache memory 100. A request for data is serviced by first determining if the data is already in the global cache memory 100.

Figure 4:
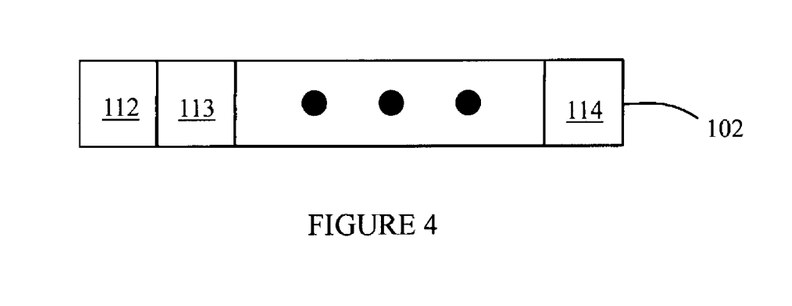
FIG. 4 is a schematic diagram illustrating cache slot having a plurality of sectors according to an embodiment of the system described herein.

Referring to FIG. 4, the slot 102 is shown as including a plurality of sectors 112-114. In an embodiment described herein, the slot 102 may correspond to eight sectors, a sector may correspond to sixteen blocks and a block may correspond to 512 bytes of data. The size of a track of one of the disks 36a-36c may be the same as the size of one of the slots 102-104. In an embodiment herein, data may be fetched from one of the disks 36a-36c in minimum increments of a sector (i.e., one or more sectors of a track). In some cases, write pending data may be less than a sector. Of course, other data sizes/increments may also be used and, in some cases, it may be possible to have variable track/sector/block sizes. Similarly, the increments by which data is fetched from one of the disks 36a-36c may also be different and, in some cases, variable size minimum increments may be used. However, for simplicity, fixed track/slot sizes having eight sectors per track, with the minimum amount of data that may be fetched being one sector, will be used in the remainder of the discussion herein.

Figure 5:
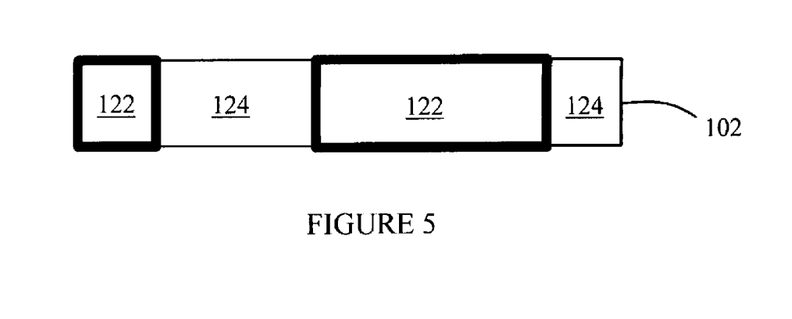
FIG. 5 is a schematic diagram illustrating cache slot having some data that has been fetched and having other areas undefined according to an embodiment of the system described herein.

Referring to FIG. 5, the slot 102 is shown as including data 122 that has been fetched from a corresponding track of one of the disks 36a-36c as well as portions 124 that are undefined (i.e., have not been fetched from one of the disks 36a-36c). Since each fetch may be one or more sectors, then each of the sectors of the slot 102 may either have been fetched 122 or be undefined 124.

An avoidable read-miss of a sector is one that could have been averted had the sector been pre-fetched when other sectors of the same track had been previously fetched. Thus, for example, following fetching the data 122 of the slot 102, a subsequent access of data corresponding to the undefined portion 124 is an avoidable read-miss. Note that a read-miss is unavoidable if the track corresponding to the data is not already in the global cache memory 100.

An excessive number of avoidable read-misses is an indication that the system should more frequently pre-fetch additional sectors of a track in connection with fetching one of the sectors in response to a read request. Of course, all avoidable read-misses may be eliminated by fetching an entire track the first time any data for the track is fetched. However, this may be inefficient for a number of reasons. For example, pre-fetching unnecessary data may use up bandwidth in a way that degrades performance of the system, and may increase the disk queuing time. Accordingly, it is desirable to minimizes avoidable read-misses while also minimizing the amount of additional data for a track/slot that the system reads.

The system described herein classifies read-misses as being avoidable or unavoidable and uses that data to determine when and how to pre-fetch sectors of a track. Thus, when a read-miss occurs, the system updates (increases) one or more counters. Then the system uses those counters in connection with a statistical algorithm that controls whether to read more data in a track than just the requested sector.

In addition, there are two different types of avoidable read-misses: read-misses that would have been avoided if a previous read had read the full track (RM_RFT) and read misses that would have been avoided if a previous read had read from the requested sector to the end of the end of a track (RM_REOT). Of course, in any instances where an RM_REOT read miss occurs, an RM_RFT read miss also occurs. However, it is possible for an RM_RFT read-miss to occur without an RM_REOT read miss also occurring.

The system described herein may be configured to implement either no track pre-fetch mechanism at all, a track pre-fetch mechanism that pre-fetches on the second and subsequent read misses for a track, implement a track pre-fetch algorithm like that disclosed in U.S. Pat. No. 6,529,998 to Yechiel Yochai and Robert Mason (read to end of track in some cases), or to implement an track pre-fetch algorithm that, in some cases, pre-fetches to the end of a track or pre-fetches an entire track. In an embodiment herein a user (user process) may select the particular configuration. Note that other selectable configurations may also be possible.

Figure 6:
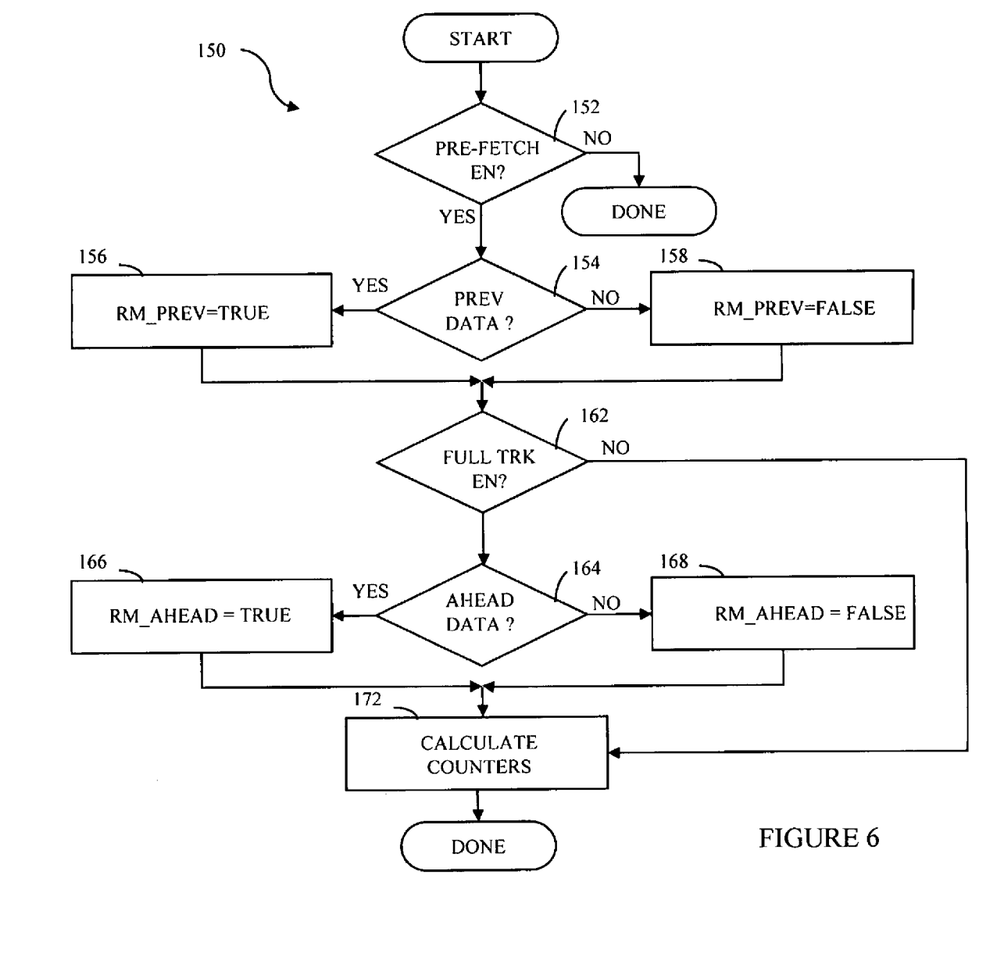
FIG. 6 is a flow chart illustrating determining how to increment counters according to an embodiment of the system described herein.

Referring to FIG. 6, a flow chart 150 illustrates steps performed in connection with collecting statistics and adjusting counters for the system described herein. The steps illustrated by the flow chart 150 may be performed each time a read-miss occurs.

Processing begins at a first step 152 where it is determined if any track pre-fetch algorithms are in use. As discussed elsewhere herein, it is possible to provide an adjustable parameter that can be set so that no track pre-fetch algorithms are in use and/or only an algorithm that pre-fetches to the end of the track on second and subsequent read misses for a track. If it is determined at the test step 152 that no first I/O pre-fetching is to be performed (that no track pre-fetch algorithms are in use and/or only an algorithm that pre-fetches to the end of the track on second and subsequent read misses for a track.), then there is no need to collect any read-miss statistics. Thus, if it is determined at the test step 152 that no pre-fetch algorithms are in use, then the process of updating statistics is complete.

If it is determined at the test step 152 that a track pre-fetch algorithm is being used, then control passes from the test step 152 to a test step 154 where it is determined if previous data for the track is already in the global cache memory 100. If a previous read for the track had fetched sectors in the track that precedes the sector being read (or the first sector being read in the case of reading a number of contiguous sectors), then the current read-miss would have been avoided if the previous read for the track had read to the end of the track (an RM_REOT read-miss). Accordingly, if it is determined at the test step 154 that previous data for the track exists, then control transfers from the test step 154 to a step 156 where a Boolean variable, RM_PREV, is set to true. Otherwise, control transfers from the test step 154 to a step 158 where RM_PREV is set to false. The RM_PREV variable, as well as the RM_AHEAD variable (discussed below), are used in follow on counter calculations.

Following either the step 156 or the step 158 is a test step 162 where it is determined if a read full track pre-fetch algorithm is in use. As discussed elsewhere herein, in some instances, it is possible to provide an adjustable parameter that can be set so that only the read to end-of-track pre-fetch algorithm is in use, in which case there is no need to collect any read-miss statistics relating to the read full track pre-fetch algorithm.

If it is determined at the test step 162 that a read full track pre-fetch algorithm is being used, then control passes from the test step 162 to a test step 164 where it is determined if data for the track is already in the global cache memory 100 in a sector that is ahead (follows) the current sector being read (or the first sector being read in the case of reading a number of contiguous sectors). If a previous read for the track had fetched sectors in the track that are ahead of the sector being read, then the current read-miss would have been avoided if the previous read for the track had read the entire track (an RM_RFT read-miss). Accordingly, if it is determined at the test step 164 that previous data for the track exists in a sector that is ahead of the sector being read, then control transfers from the test step 164 to a step 166 where a Boolean variable, RM_AHEAD, is set to true. Otherwise, control transfers from the test step 164 to a step 168 where RM_AHEAD is set to false.

Following either the step 166 or the step 168 is a step 172 where counters (RFT_CNT, REOT_CNT, and RBOT_CNT) are calculated in a manner discussed in more detail below. Note that the step 172 is also reached from the test step 162 if it is determined at the test step 162 that the read full track pre-fetch algorithm is not in use. The counters are used to determine whether to read to the and of a track and/or to read a full track rather than just reading the requested sector.

Figure 7:
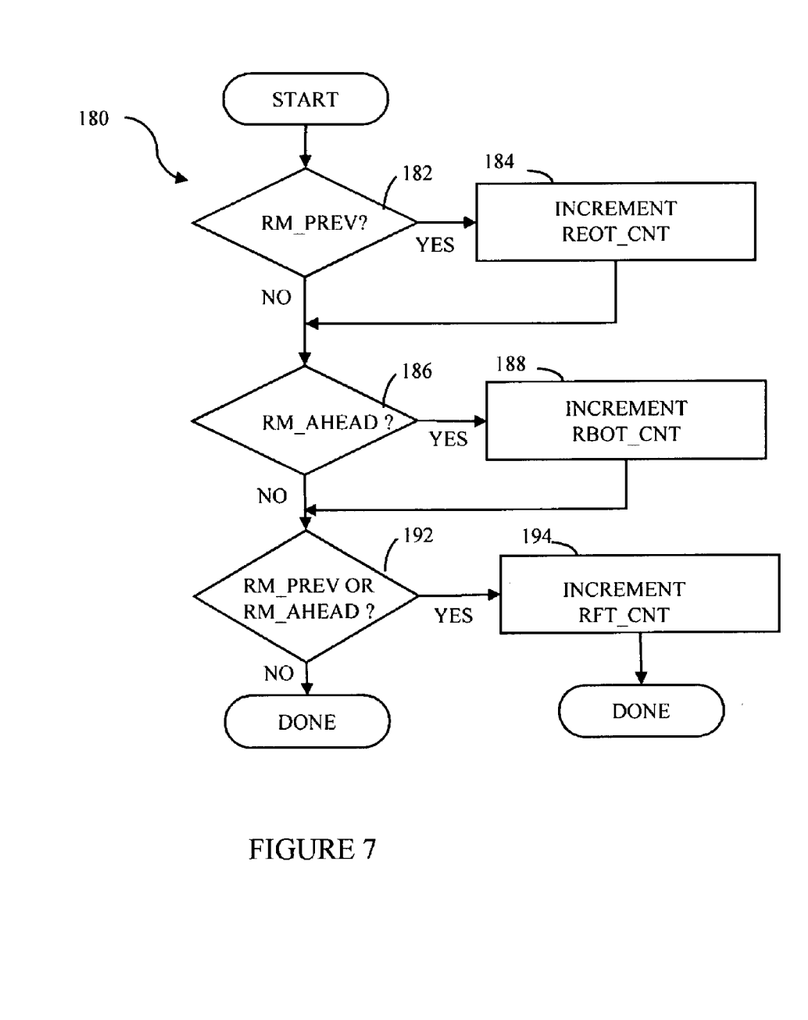
FIG. 7 is a flow chart illustrating incrementing counters according to an embodiment of the system described herein.

Referring to FIG. 7, a flow chart 180 illustrates in more detail steps performed in connection with the step 172 of the flow chart 150 of FIG. 6. Processing begins at a first step 182 where it is determined if the RM_PREV Boolean variable (discussed above) is true, indicating that the current read-miss would have been avoided if a previous read for the same track had read to the end of the track. If it is determined at the test step 182 that RM_PREV is true, then control transfers from the test step 182 to a step 184 where the REOT_CNT is incremented. Incrementing the REOT_CNT variable (and the other counters) is discussed in more detail elsewhere herein.

Following the test step 182 if RM_PREV is false, or following the step 184 is a test step 186 where it is determined if RM_AHEAD is true. If so, then control transfers from the test step 186 to a step 188 where the RBOT_CNT variable is incremented. Following the test step 186 if RM_AHEAD is false, or following the step 188 is a test step 192 where it is determined if either RM_PREV or RM_AHEAD are true. If not, then processing is complete. Otherwise, control transfers from the test step 192 to a step 194 where RFT_CNT is incremented. Following the step 194, processing is complete. Note that, in some embodiments, it may be possible to provide a single variable (e.g., RM_ANY) that is true whenever RM_PREV is true or RM_AHEAD is true.

Figure 8:
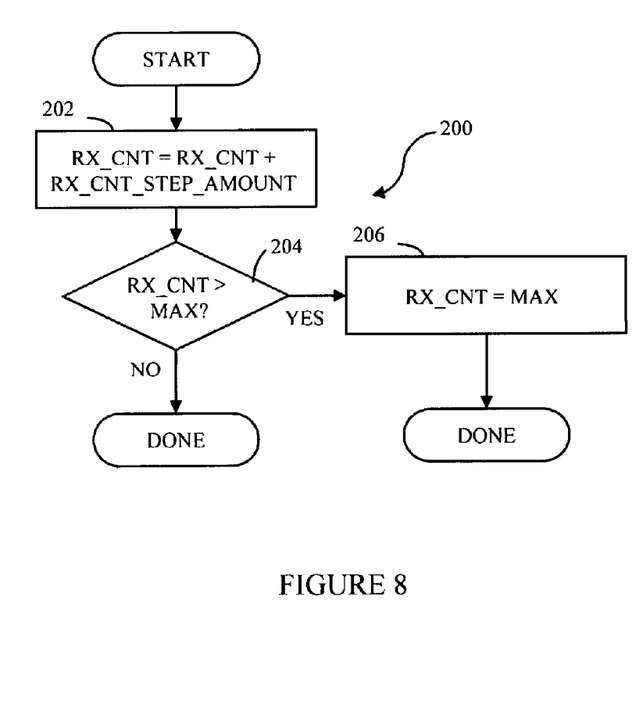
FIG. 8 is a flow chart illustrating a technique for incrementing counters according to an embodiment of the system described herein.

Referring to FIG. 8, a flow chart 200 illustrates steps performed in connection with incrementing one of the counters REOT_CNT, RBOT_CNT, and RFT_CNT, at one of the steps 184, 188, 194, discussed above in connection with the flow chart 180 of FIG. 7. Note that a counter may be initialized (when the system starts) to any appropriate value, such as mid way between the minimum value of the counter and the maximum value of the counter. In other embodiments, the counters may be initialized to zero. Following the initialization, the counter may be incremented or decremented, for example as described herein.

Processing begins at a first step 202 where the counter is incremented by an incremental amount, which may be a fixed amount, a variable amount, an amount that varies according to the current value of the counter being incremented, a function of a minimum acceptable value for the counter, etc. Any appropriate incremental amount may be used. The incremental amount may be made larger or smaller based on functional factors, such as observed operations of the system. Generally, the larger the incremental amount, the more the system favors reading additional sectors. In an embodiment herein, the counters range from one to 255. The incremental amount may be determined according to the methodology in U.S. Pat. No. 6,529,998 to to Yechiel Yochai and Robert Mason. Note also that setting the incremental amount and/or the ratio of the incremental amount to the decrement amount (described below) may depend on a variety of observable system parameters and may be adjusted to maximize system performance.

Following the step 202 is a test step 204 where it is determined if increases the counter has caused the counter to exceed the maximum value for the counter. If not, then processing is complete. Otherwise, control transfers from the test step 204 to a step 206 where the counter is set to its maximum value. Following the step 206, processing is complete.

Figure 9:
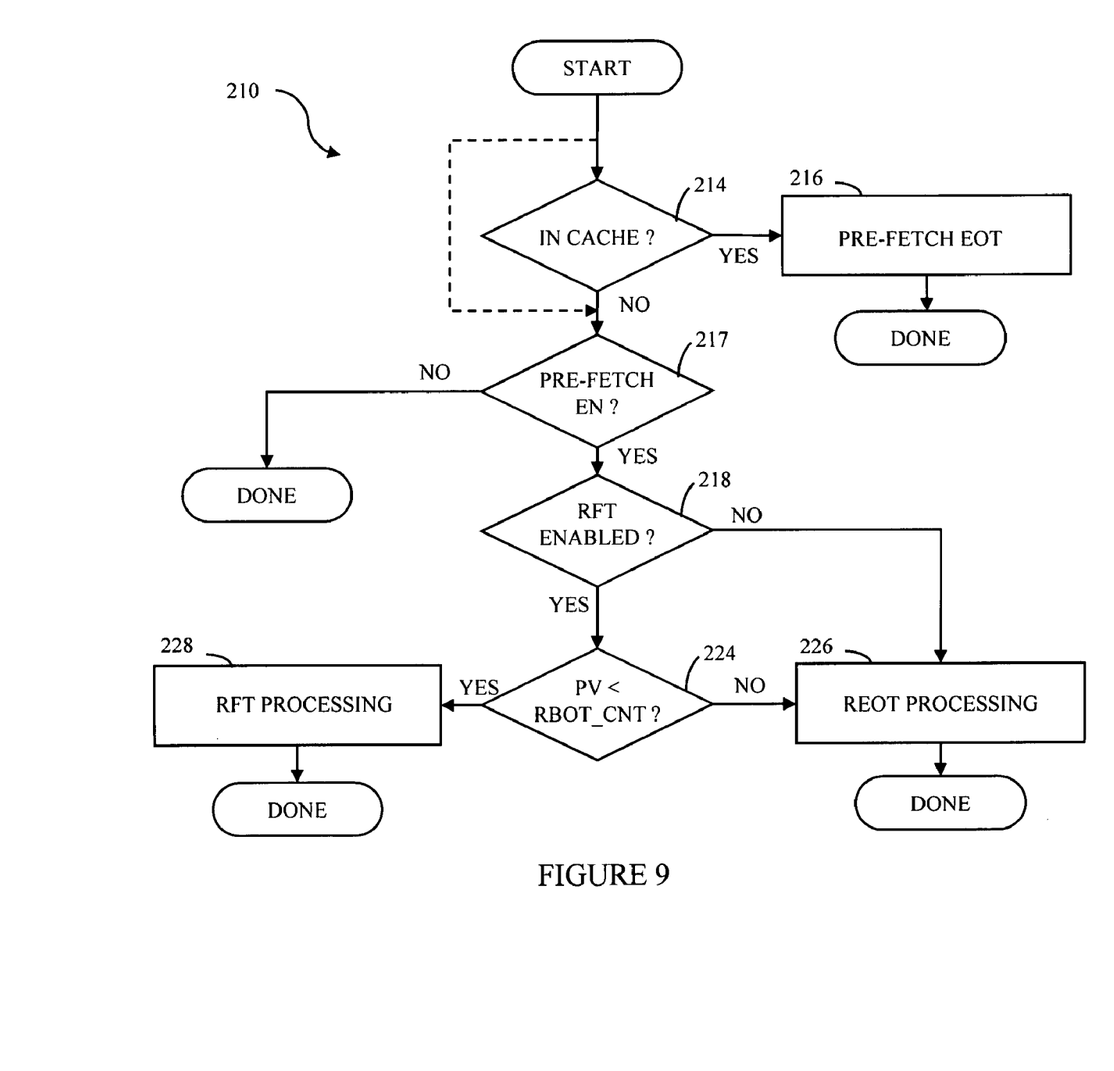
FIG. 9 is a flow chart illustrating determining whether to pre-fetch data according to an embodiment of the system described herein.

Referring to FIG. 9, a flow chart 210 illustrates steps performed in connection with determining whether to read to the end of a track and/or whether to read a full track. Processing begins at a first step 214 where it is determined if other portions of the track are already in the global cache memory, indicating that the track was recently accessed and that the current read is the second (or subsequent) read-miss of data that follows data from the track that has already been read. If it is determined at the test step 214 that other (prior) portions of the track are already in the global cache memory 100, then control transfers from the test step 214 to a step 216 where a fetch is performed to fetch data from the requested sector to the end of the track. Following the step 216, processing is complete.

If it is determined at the test step 214 that there are not other (prior) portions of the track in global cache memory that are before the current read miss, then control transfers to a step 217 where it is determined if any track pre-fetch algorithms are enabled. As discussed elsewhere herein, the system may be configured so that no pre-fetching is performed. If it is determined at the test step 217 that no track pre-fetching is to be performed, then processing is complete and only the requested data will be bought to cache. Use of the step 214 causes the test for whether track pre-fetch algorithms are in use to only be performed on a first read miss for a track since, on second and subsequent read misses, a read to end of track is performed (at the step 216). Note, that, in some embodiments, it is possible to forgo the step 214 (and thus the step 216) altogether. This is illustrated by the dashed line in FIG. 9 that circumvents the step 214. Note also that it is possible to exchange the order of the test at the step 214 and the test at the step 217 so that the system first checks if pre-fetch is enabled (the step 217) and then checks if this is a second or subsequent read of data that follows data already read from the same track first (the step 214) and, if so, reads to the end of the track (the step 216). In such case if pre-fetch is disable no track pre-fetch will be performed.

If it is determined at the test step 217 that track pre-fetching is to be performed, then control transfers from the step 217 to a test step 218 where it is determined if the read full track pre-fetch algorithm is enabled. If so, then control transfers from the test step 218 to a test step 224 where it is determined if a predefined value (such as a user settable parameter) is less than the value of the RBOT_CNT variable. The predefined value may be any value that ranges between the minimum possible value for RBOT_CNT to the maximum possible value for RBOT_CNT. In one embodiment the value for RBOT_CNT may be set to slightly less than the maximum possible value.

If it is determined at the test step 224 that the predefined value is not less than RBOT_CNT, then control passes from the test step 224 to a step 226 where REOT algorithm processing is performed. The REOT algorithm processing performed at the step 226 is described in more detail elsewhere herein. Note that the step 226 is also reached from the step 218 if it is determined that the read full track pre-fetch algorithm is not being used. Following the step 226, processing is complete. If it is determined at the test step 224 that the predefined value is less than the RBOT_CNT value, then control passes from the test step 224 to a step 228, where the read full track pre-fetch algorithm processing is performed. The processing performed at the step 228 is described in more detail elsewhere herein. Following the step 228, processing is complete.

Note that comparison of the predefined value with RBOT_CNT is only one of many possible mechanisms that may be used to chose between using the REOT algorithm and the full track algorithm. Other appropriate techniques may be used instead, including possibly generating a random number that is compared to the value of RBOT_CNT. In addition, selection of the predefined value may be based on any appropriate criteria, including observable system performance with different values used for the predefined value.

Figure 10:
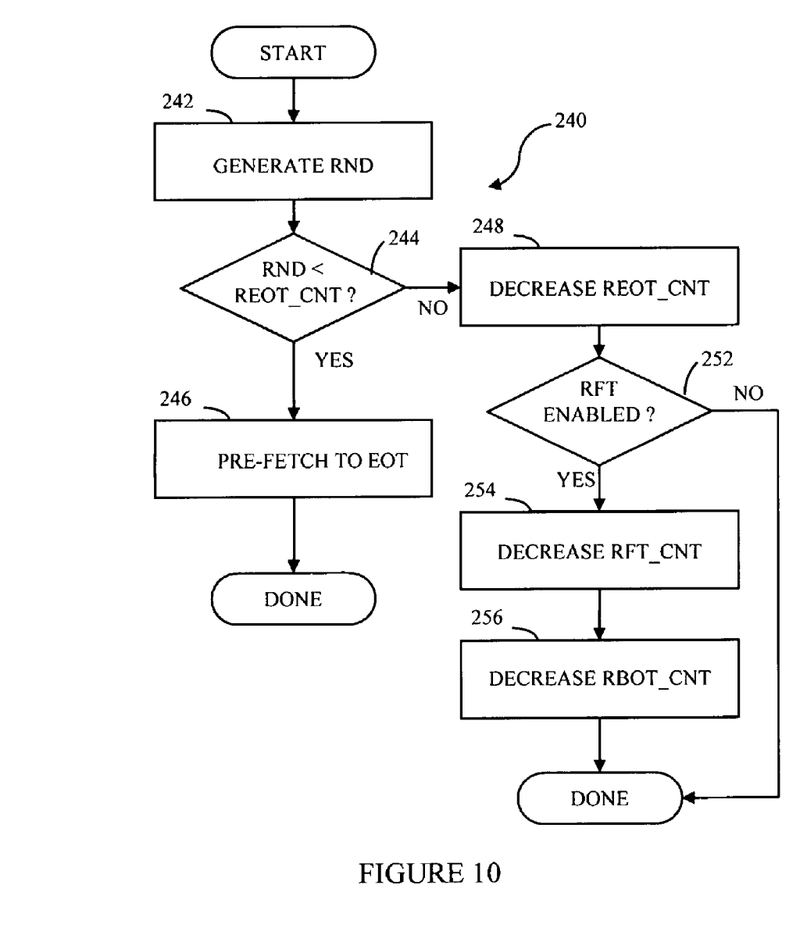
FIG. 10 is a flow chart illustrating pre-fetching data to the end of a track or decrementing counters according to an embodiment of the system described herein.

Referring to FIG. 10, a flow chart 240 illustrates steps performed in connection with the REOT processing step 226 of the flow chart 210 of FIG. 9. Processing begins at a first step 242 where a random number is generated. The random number is restricted to range corresponding to the range of the REOT_CNT variable. For example, the random number generated at the step 242 may be restricted to a range from the minimum possible value for REOT_CNT to value slightly greater than (i.e., one more than) the maximum possible value for REOT_CNT. Following the step 242 is a test step 244 where it is determined if the random number is less than the value of REOT_CNT. If so, then control passes from the test step 244 to a step 246 where the system reads to the end of the track. Following the step 246, processing is complete.

If it is determined at the test step 244 that the random number is not less than the value of REOT_CNT, then control transfers from the test step 244 to a step 248 where the value of REOT_CNT is decremented. Decrementing the REOT_CNT variable (and other counters) is like incrementing counters, described elsewhere herein. However, the amount used for decrementing may be different than the amount used for incrementing. In some embodiments the formula given at U.S. Pat. No. 6,529,998 can be used to determine the increasing step and the ratio between the increasing and decreasing steps. In an embodiment herein, the ratio of amount used for decrementing to the amount used for incrementing is one to nine. The relationship between the amount used for decrementing counters and the amount used for incrementing counters may correspond to the perceived cost (e.g., latency time) of performing unnecessary pre-fetch operations compared with the perceived cost of avoidable read-misses. Note also that different and independent increment and decrement amounts may be assigned to each of the counters.

Following the step 248 is a test step 252 where it is determined if the read full track algorithm is enable (discussed in detail elsewhere herein). If not, then processing is complete. Otherwise, control passes from the step 252 to a step 254 where the RFT_CNT variable is decremented. Following the step 254 is a step 256 where the RBOT_CNT variable is decremented. Following the step 256, processing is complete.

Figure 11:
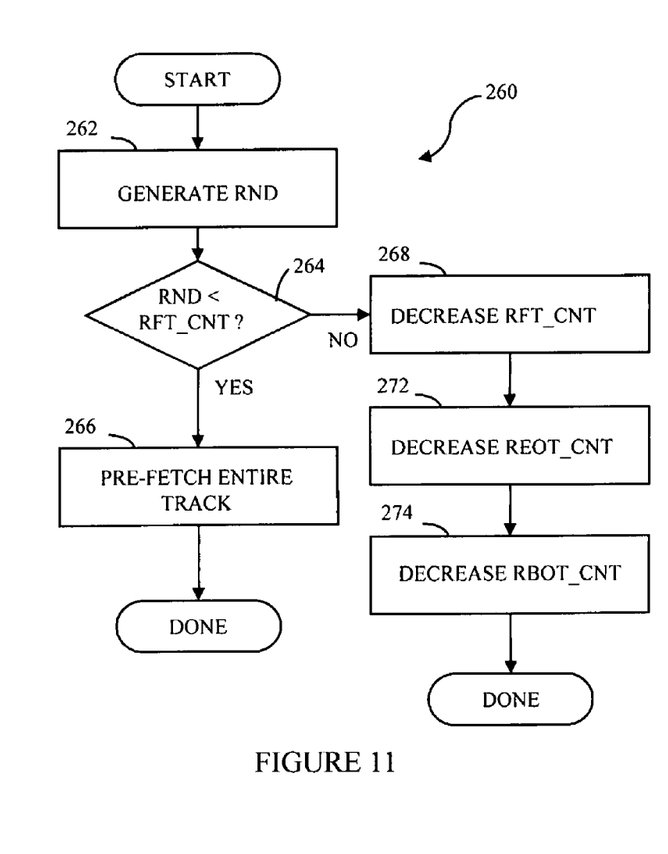
FIG. 11 is a flow chart illustrating pre-fetching an entire track's worth of data or decrementing counters according to an embodiment of the system described herein.

Referring to FIG. 11, a flow chart 260 illustrates steps performed in connection with the RFT processing step 228 of the flow chart 210 of FIG. 9. Processing begins at a first step 252 where a random number is generated. Just as with the step 242 of the flow chart 240 of FIG. 10, the random number generated at the step 262 may be restricted to range corresponding to the range of the RFT_CNT variable The random number is restricted to range corresponding to the range of the RFT_CNT variable. For example, the random number generated at the step 242 may be restricted to a range from the minimum possible value for RFT_CNT to value slightly greater than (i.e., one more than) the maximum possible value for RFT_CNT. Following the step 262 is a test step 264 where it is determined if the random number is less than the value of RFT_CNT. If so, then control passes from the test step 264 to a step 266 where the system reads to the entire track. Following the step 266, processing is complete.

If it is determined at the test step 264 that the random number is not less than the value of RFT_CNT, then control transfers from the test step 264 to a step 268 where the value of RFT_CNT is decremented. Decrementing the counts is described elsewhere herein. Following the step 268, is a step 272 where the REOT_CNT variable is decremented. Following the step 272 is a step 274 where the RBOT_CNT variable is decremented. Following the step 274, processing is complete.

Although the system described herein uses tracks/sectors/blocks as units of data for certain purposes, it should be understood that other units of data (including, possibly, variable length units of data) may be used. This also applies to other data structures and data units. In addition, in some instances, the order of steps in the flow charts may be modified, where appropriate. The processes described herein may be controlled by executable code stored on a computer-readable medium on one or more processors (e.g., on the directors 52a-52c) and other devices described herein that execute steps of the described processes.

While the invention has been disclosed in connection with various embodiments, modifications thereon will be readily apparent to those skilled in the art. Accordingly, the spirit and scope of the invention is set forth in the following claims.

What is claimed is:

1. A method for adaptively pre-fetching data, comprising:
collecting a first set of statistics based on a number of avoidable read-misses in which data exists that is prior to data being read;
collecting a second set of statistics based on a number of avoidable read-misses in which data exists that follows data being read;
collecting a third set of statistics based on said first and second sets of statistics;
on the basis of said second set of statistics, selecting a pre-fetch technique from a first technique that pre-fetches data following data being read and a second technique that pre-fetches data before and following the data being read, wherein the selecting of the second technique reduces a number of instances where out of order reads result in avoidable read-misses, and wherein the avoidable read-misses are read-misses that could have been averted had a sector of data at a storage location been pre-fetched with other sectors of data at the storage location that were previously fetched;

upon detection of an avoidable read-miss and selecting the first technique, pre-fetching data following data being read based on comparison of a generated random number and the first set of statistics; and upon detection of the avoidable read-miss and selecting the second technique, pre-fetching data before and following data being read based on a comparison of a generated random number and the third set of statistics.

2. The method of claim 1, wherein pre-fetching data before and following data being read includes fetching an entire track from a disk.

3. The method of claim 1, wherein pre-fetching data following data being read includes fetching data from the data being read to the end of a track on a disk.

4. The method of claim 1, wherein selecting a pre-fetch technique includes comparing the second set of statistics with a predefined value.

5. The method of claim 4, wherein the predefined value is a user settable parameter.

6. The method of claim 1, wherein, following selection of the first technique, data following data being read is pre-fetched if the generated random number is less than a value based on the first set of statistics and wherein, following selection of the second technique, data before and following data being read is pre-fetched if the generated random number is less than a value based on the third set of statistics.

7. The method of claim 6, wherein, upon selection of the first technique and the generated random number being greater than the value based on the first set of statistics, the values based on the sets of statistics are decremented.

8. The method of claim 6, wherein, upon selection of the second technique and the generated random number being greater than the value based on the third set of statistics, the values based on the sets of statistics are decremented.

9. Computer software, provided in a non-transitory computer-readable storage medium, that adaptively pre-fetches data, the software comprising:
executable code that collects a first set of statistics based on a number of avoidable read-misses in which data exists that is prior to data being read;
executable code that collects a second set of statistics based on a number of avoidable read-misses in which data exists that follows data being read;
executable code that collects a third set of statistics based on said first and second sets of statistics;
executable code that uses said second set of statistics to select a pre-fetch technique from a first technique that pre-fetches data following data being read and a second technique that pre-fetches data before and following the data being read, wherein the selecting of the second technique reduces a number of instances where out of order reads result in avoidable read-misses, and wherein the avoidable read-misses are read-misses that could have been averted had a sector of data at a storage location been pre-fetched with other sectors of data at the storage location that were previously fetched;
executable code that pre-fetches data following data being read based on comparison of a generated random number and the first set of statistics upon detection of an avoidable read-miss and selecting the first technique; and
executable code that pre-fetches data before and following data being read based on a comparison of a generated random number and the third set of statistics upon detection of the avoidable read-miss and selecting the second technique.

10. The computer software of claim 9, wherein pre-fetching data before and following data being read includes fetching an entire track from a disk.

11. The computer software of claim 9, wherein pre-fetching data following data being read includes fetching data from the data being read to the end of a track on a disk.

12. The computer software of claim 9, wherein selecting a pre-fetch technique includes comparing the second set of statistics with a predefined value.

13. The computer software of claim 12, wherein the predefined value is a user settable parameter.

14. The computer software of claim 9, wherein, following selection of the first technique, data following data being read is pre-fetched if the generated random number is less than a value based on the first set of statistics and wherein, following selection of the second technique, data before and following data being read is pre-fetched if the generated random number is less than a value based on the third set of statistics.

15. The computer software of claim 14, wherein, upon selection of the first technique and the generated random number being greater than the value based on the first set of statistics, the values based on the sets of statistics are decremented.

16. The computer software of claim 14, wherein, upon selection of the second technique and the generated random number being greater than the value based on the third set of statistics, the values based on the sets of statistics are decremented.

17. A storage device, comprising:
a plurality of directors;
a plurality of disk drives coupled to at least some of the directors;
a global memory, coupled to the directors, wherein at least one of the directors includes software that pre-fetches data from the disks into global memory, the software including executable code that collects a first set of statistics based on a number of avoidable read-misses in which data exists that is prior to data being read, executable code that collects a second set of statistics based on a number of avoidable read-misses in which data exists that follows data being read, executable code that collects a third set of statistics based on said first and second sets of statistics, executable code that uses said second set of statistics to select a pre-fetch technique from a first technique that pre-fetches data following data being read and a second technique that pre-fetches data before and following the data being read, wherein the selecting of the second technique reduces a number of instances where out of order reads result in avoidable read-misses, and wherein the avoidable read-misses are read-misses that could have been averted had a sector of data at a storage location been pre-fetched with other sectors of data at the storage location that were previously fetched, executable code that reads data following data being read based on comparison of a generated random number and the first set of statistics upon detection of an avoidable read-miss and selecting the first technique, and executable code that reads data before and following data being read based on a comparison of a generated random number and the third set of statistics upon detection of the avoidable read-miss and selecting the second technique.

18. The storage device of claim 17, wherein pre-fetching data before and following data being read includes fetching an entire track from a disk.

19. The storage device of claim 17, wherein pre-fetching data following data being read includes fetching data from the data being read to the end of a track on a disk.

20. The storage device of claim 17, wherein selecting a pre-fetch technique includes comparing the second set of statistics with a predefined value.

21. The storage device of claim 20, wherein the predefined value is a user settable parameter.

22. A method of determining when to pre-fetch a full track of data on a disk, comprising:
    collecting statistics based on a number of avoidable read-misses in which data exists that is in the same track as data being read; and
    upon detection of an avoidable read-miss, selecting and performing a pre-fetch technique for pre-fetching a full track of data based on comparison of a generated random number and the set of statistics, wherein the selecting of the pre-fetch technique reduces a number of instances where out of order reads result in avoidable read-misses, and wherein the avoidable read-misses are read-misses that could have been averted had a sector of data at a storage location been pre-fetched with other sectors of data at the storage location that were previously fetched.

23. The method of claim 22, wherein the statistics are based on tracking a number of avoidable read-misses in which data exists that follows data being read and a number of avoidable read-misses in which data exists that is prior to data being read.

24. Computer software, provided in a non-transitory computer-readable medium, that determines when to pre-fetch additional data from a disk, comprising:
    executable code that provides for selection of one of the following modes: a first mode for pre-fetch to end of track only, a second mode for pre-fetch entire track, a third mode where no pre-fetch is performed, and a fourth mode where pre-fetch to an end of track is performed upon second and subsequent read misses for a track, wherein the selecting of the second mode reduces a number of instances where out of order reads result in avoidable read-misses, and wherein the avoidable read-miss are read-misses that could have been averted had a sector of data at a storage location been pre-fetched with other sectors of data at the storage location that were previously fetched;
    executable code that collects a first set of statistics based on a number of avoidable read-misses in which data exists that is prior to data being read;
    executable code that collects a second set of statistics based on a number of avoidable read-misses in which data exists that follows data being read in response to selection of the second mode;
    executable code that collects a third set of statistics based on said first and second sets of statistics in response to selection of the second mode;
    executable code that pre-fetches data following data being read based on comparison of a generated random number and the first set of statistics upon detection of an avoidable read-miss and on selecting of the first mode; and
    executable code that pre-fetches data before and following data being read based on a comparison of a generated random number and the third set of statistics upon detection of the avoidable read-miss and selecting the second mode.

25. Computer software, according to claim 24, wherein the second mode also includes pre-fetching to the end of track, the software further comprising:
    executable code that, in response to selection of the second mode, uses said second set of statistics to select a pre-fetch technique from a first technique that pre-fetches data following data being read and a second technique that pre-fetches data before and following the data being read; and
    executable code that pre-fetches data following data being read based on selection of the second mode and the first technique.

* * * * *